United States Patent
Liu et al.

(10) Patent No.: US 8,876,070 B2
(45) Date of Patent: Nov. 4, 2014

(54) THIN-TYPE COLLAPSIBLE FOOT STAND

(75) Inventors: Ching-Wei Liu, Taoyuan County (TW); Yu-Ting Cheng, Hsinchu County (TW)

(73) Assignee: Azurewave Technologies, Inc., New Taipei (TW)

(*) Notice: Subject to any disclaimer, the term of this patent is extended or adjusted under 35 U.S.C. 154(b) by 203 days.

(21) Appl. No.: 13/492,862

(22) Filed: Jun. 9, 2012

(65) Prior Publication Data

US 2013/0256492 A1    Oct. 3, 2013

(30) Foreign Application Priority Data

Mar. 30, 2012   (TW) .............................. 101111433 A

(51) Int. Cl.
| | |
|---|---|
| *F16M 11/38* | (2006.01) |
| *F16M 13/00* | (2006.01) |
| *A47G 29/00* | (2006.01) |
| *F16M 13/02* | (2006.01) |
| *F16M 11/24* | (2006.01) |
| *F16M 11/10* | (2006.01) |
| *F16M 11/20* | (2006.01) |

(52) U.S. Cl.
CPC .............. *F16M 13/02* (2013.01); *F16M 11/24* (2013.01); *F16M 11/10* (2013.01); *F16M 11/2021* (2013.01)
USPC ...................... 248/188.6; 248/346.3; 248/398; 361/679.22; 16/369

(58) Field of Classification Search
CPC ....... F16M 11/24; F16M 11/10; F16M 13/02; F16M 11/2021
USPC .............. 248/349, 919, 463, 136, 138, 188.6, 248/346.3, 349.1; 361/679.22; 16/369
See application file for complete search history.

(56) References Cited

U.S. PATENT DOCUMENTS

| | | | | |
|---|---|---|---|---|
| 2,543,352 A | * | 2/1951 | Brown | 248/183.2 |
| 3,704,848 A | * | 12/1972 | Trebes et al. | 248/163.1 |
| 4,341,452 A | * | 7/1982 | Korling | 396/428 |
| 4,733,259 A | * | 3/1988 | Ng | 396/419 |
| 4,751,540 A | * | 6/1988 | Jones | 396/419 |
| 4,859,092 A | * | 8/1989 | Makita | 400/83 |
| 5,255,214 A | * | 10/1993 | Ma | 361/679.06 |
| 5,644,469 A | * | 7/1997 | Shioya et al. | 361/679.06 |
| 5,810,313 A | * | 9/1998 | Armstrong | 248/346.2 |
| 6,031,714 A | * | 2/2000 | Ma | 361/679.22 |

(Continued)

FOREIGN PATENT DOCUMENTS

DE            4412877 A1 * 12/1995 ............. F16M 11/08

*Primary Examiner* — Jonathan Liu
*Assistant Examiner* — Chiedu Chibogu
(74) *Attorney, Agent, or Firm* — Li & Cai Intellectual Property (USA) Office

(57) ABSTRACT

A thin-type collapsible foot stand includes a base unit, a first rotatable unit and a second rotatable unit. The base unit includes a base body having a first pivot portion, a first connection portion and a first extending portion. The first rotatable unit includes a rotatable platform having a second pivot portion corresponding to the first extending portion, a second connection portion corresponding to the first connection portion, and a second extending portion corresponding to the first pivot portion. The second rotatable unit includes two rotatable support frames. Each rotatable support frame includes a support body disposed between the base body and the rotatable platform, a first pivot structure connected between one end portion of the support body and the first pivot portion, and a second pivot structure connected between the other end portion of the support body and the second pivot portion.

8 Claims, 6 Drawing Sheets

(56) References Cited

U.S. PATENT DOCUMENTS

| | | | | |
|---|---|---|---|---|
| 6,154,925 A * | 12/2000 | Miura | | 16/338 |
| 6,189,850 B1 * | 2/2001 | Liao et al. | | 248/292.14 |
| 6,266,236 B1 * | 7/2001 | Ku et al. | | 361/679.27 |
| 6,272,006 B1 * | 8/2001 | Lee | | 361/679.27 |
| 6,430,038 B1 * | 8/2002 | Helot et al. | | 361/679.05 |
| 6,464,195 B1 * | 10/2002 | Hildebrandt | | 248/460 |
| 6,729,778 B1 * | 5/2004 | Wu et al. | | 396/428 |
| 6,972,947 B2 * | 12/2005 | Duncan | | 361/679.55 |
| 7,360,304 B2 * | 4/2008 | Trace | | 29/751 |
| 7,599,181 B2 * | 10/2009 | Chuang et al. | | 361/679.55 |
| 7,630,193 B2 * | 12/2009 | Ledbetter et al. | | 361/679.21 |
| 7,766,296 B2 * | 8/2010 | Choi et al. | | 248/346.01 |
| 7,986,517 B2 * | 7/2011 | Jiang et al. | | 361/679.27 |
| 8,100,376 B2 * | 1/2012 | Ye | | 248/454 |
| 8,152,344 B2 * | 4/2012 | Gu et al. | | 362/427 |
| 8,191,838 B2 * | 6/2012 | Carter | | 248/188.6 |
| 8,262,047 B2 * | 9/2012 | Lindblad et al. | | 248/372.1 |
| 8,290,549 B2 * | 10/2012 | Reeves et al. | | 455/575.3 |
| 8,568,041 B2 * | 10/2013 | Cherubin | | 396/428 |
| 8,611,076 B2 * | 12/2013 | Wetzel et al. | | 361/679.06 |
| 8,616,508 B1 * | 12/2013 | Coleman | | 248/176.1 |
| 2007/0145210 A1 * | 6/2007 | Fawcett et al. | | 248/176.1 |
| 2010/0172072 A1 * | 7/2010 | Monaco | | 361/679.01 |
| 2011/0147547 A1 * | 6/2011 | Fitzpatrick et al. | | 248/157 |
| 2012/0170194 A1 * | 7/2012 | Lord et al. | | 361/679.02 |
| 2013/0068916 A1 * | 3/2013 | Mensing et al. | | 248/558 |
| 2013/0214022 A1 * | 8/2013 | Harvey | | 224/623 |

* cited by examiner

THIN-TYPE COLLAPSIBLE FOOT STAND

BACKGROUND OF THE INVENTION

1. Field of the Invention

The instant disclosure relates to a foot stand, and more particularly, to a thin-type collapsible foot stand.

2. Description of Related Art

With the development of science and technology, various projection apparatuses have been widely used in various situations, such as briefings, lectures, theaters, audio-visual teaching, interactive teaching, family theatre sets and the like. In order to meet the requirements of users, the profile design of a projection apparatus will tend to be more beautiful and small, and adjustment of the projection angle of the projection apparatus may be implemented by configuring an adjusting leg. In the prior art, a projection apparatus includes a casing, a projection lens, two lifting legs and an adjusting leg. The casing comprises a leading end, a back end and a bottom, and the projection lens is assembled on the leading end of the casing. The two lifting legs, for example, are respectively configured on the two sides of the bottom of the casing near the leading end, and the adjusting leg, for example, is configured on the middle position of the bottom of the casing near the back end. When using the projection apparatus, users may change the top angle of the projection lens and the tilting angle of the projection apparatus by respectively adjusting the two lifting legs, so as to change the position of the image projected by the projection apparatus.

SUMMARY OF THE INVENTION

One aspect of the instant disclosure relates to a thin-type collapsible foot stand for a user to adjust the usage height and the usage angle of any object (such as projector) fastened on the thin-type collapsible foot stand according to different requirements.

One of the embodiments of the instant disclosure provides a thin-type collapsible foot stand, comprising: a base unit, a first rotatable unit and a second rotatable unit. The base unit includes a base body, wherein the base body has a first pivot portion, a first connection portion extending from the first pivot portion, and a first extending portion extending from the first connection portion. The first rotatable unit includes a rotatable platform corresponding to the base body, wherein the rotatable platform has a second pivot portion corresponding to the first extending portion, a second connection portion extending from the second pivot portion and corresponding to the first connection portion, and a second extending portion extending from the second connection portion and corresponding to the first pivot portion. The second rotatable unit includes two rotatable support frames, wherein each rotatable support frame includes a support body disposed between the base body and the rotatable platform, a first pivot structure connected between one end portion of the support body and the first pivot portion, and a second pivot structure connected between the other end portion of the support body and the second pivot portion, thus the two rotatable support frames are rotatably and pivotally disposed between the base body and the rotatable platform.

Furthermore, the first pivot portion has two first fixing holes respectively formed on two opposite sides thereof, and the second pivot portion has two second fixing holes respectively formed on two opposite sides thereof, wherein each first pivot structure includes a first inner pivot element fixed in the corresponding first fixing hole and a first outer pivot element fixed in the corresponding support body and pivotally connected to the first inner pivot element, and each second pivot structure includes a second inner pivot element fixed in the corresponding second fixing hole and a second outer pivot element fixed in the corresponding support body and pivotally connected to the second inner pivot element.

Another one of the embodiments of the instant disclosure provides a thin-type collapsible foot stand, comprising: a base unit, a first rotatable unit and a second rotatable unit. The base unit includes a base body, wherein the base body has a first lateral surface and a second lateral surface corresponding to the first lateral surface. The first rotatable unit includes a rotatable platform corresponding to the base body, wherein the rotatable platform has a first lateral surface and a second lateral surface corresponding to the first lateral surface of the rotatable platform, the first lateral surface of the base body and the first lateral surface of the rotatable platform are substantially flushed with each other, and the second lateral surface of the base body and the second lateral surface of the rotatable platform are substantially flushed with each other. The second rotatable unit includes two rotatable support frames respectively disposed on the first lateral surface and the second lateral surface of the base body and respectively disposed on the first lateral surface and the second lateral surface of the rotatable platform, wherein the two rotatable support frames are rotatably and pivotally disposed between the base body and the rotatable platform.

Therefore, because the two rotatable support frames are rotatably and pivotally disposed between the base body and the rotatable platform, the usage height and the usage angle of any object (such as projector) fastened on the thin-type collapsible foot stand can be adjusted according to different requirements.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
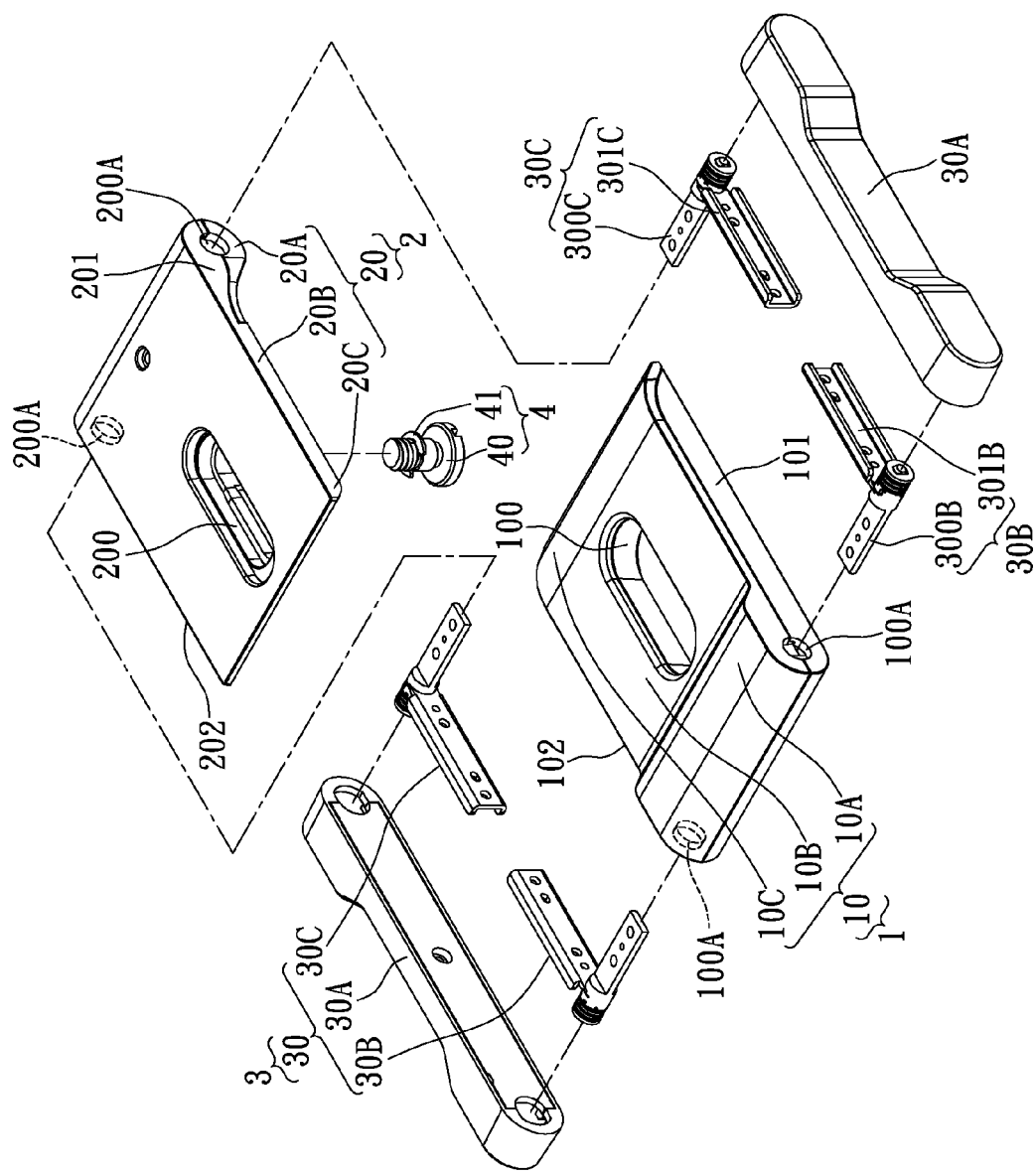
FIG. 1 shows a perspective, exploded, schematic view of the thin-type collapsible foot stand having been collapsed according to the instant disclosure.
Figure 2:
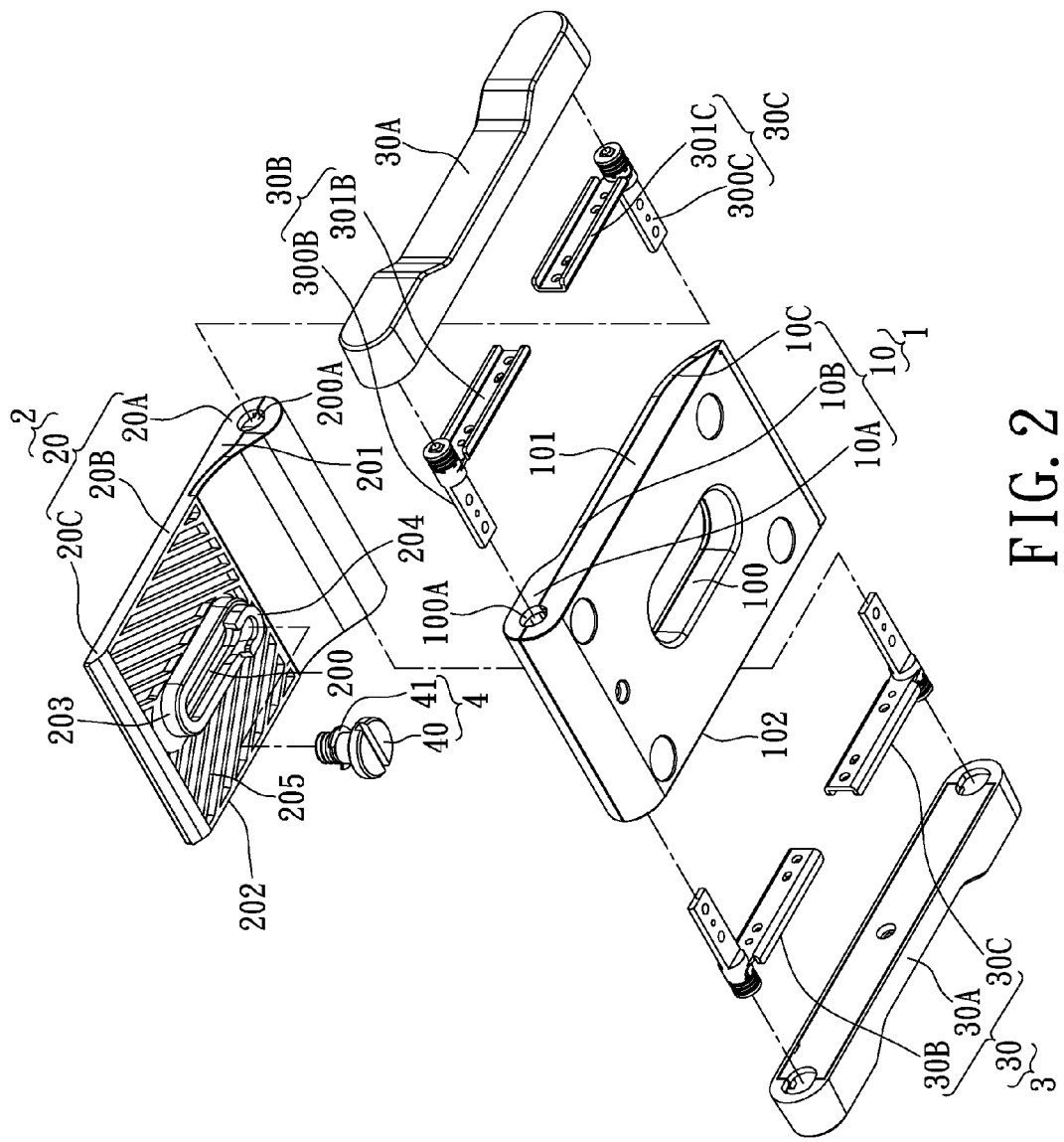
FIG. 2 shows another perspective, exploded, schematic view of the thin-type collapsible foot stand having been collapsed according to the instant disclosure.
Figure 3:
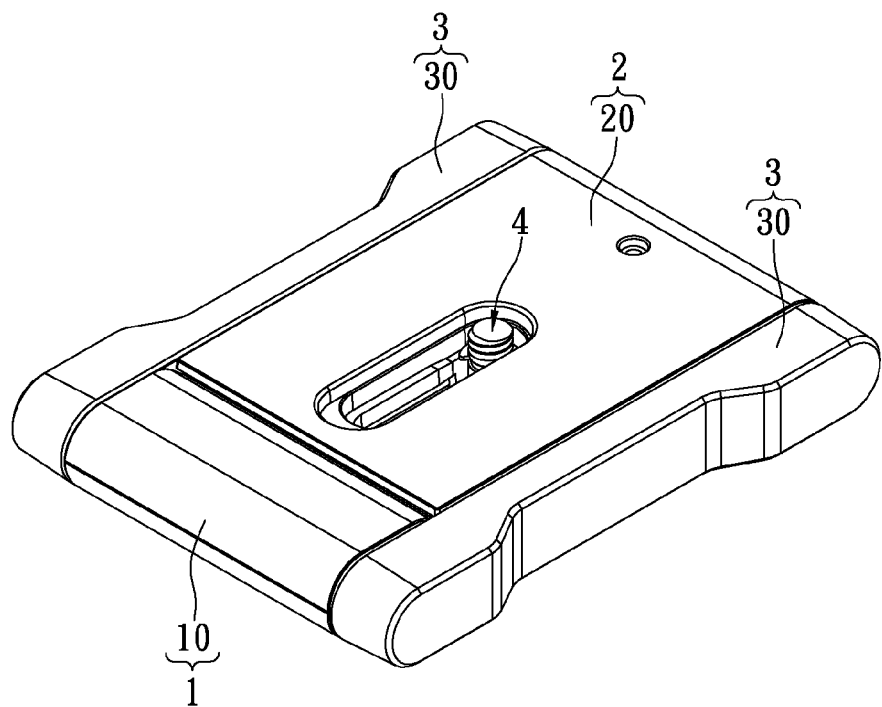
FIG. 3 shows a perspective, assembled, schematic view of the thin-type collapsible foot stand having been collapsed according to the instant disclosure.
Figure 4:
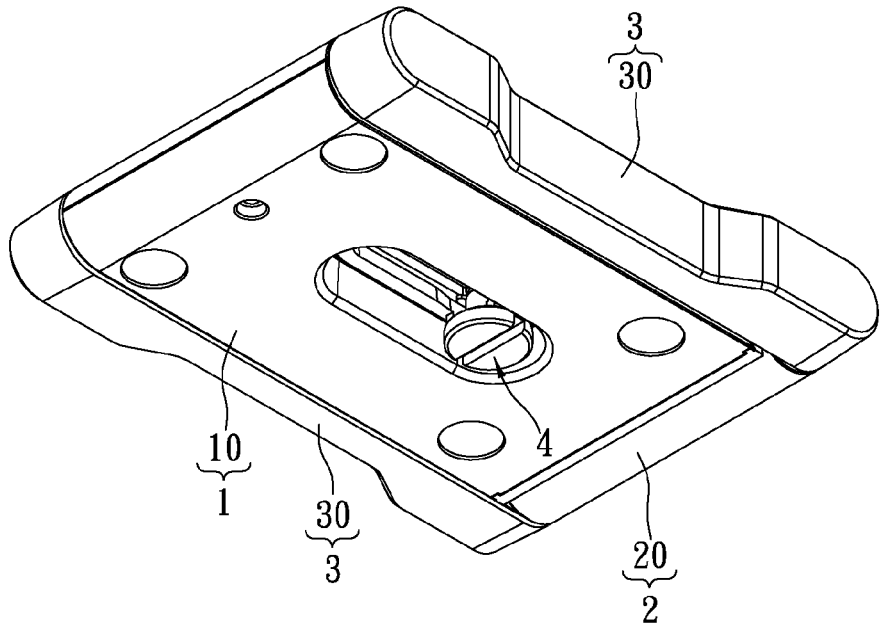
FIG. 4 shows another perspective, assembled, schematic view of the thin-type collapsible foot stand having been collapsed according to the instant disclosure.

Referring to FIG. 1 to FIG. 7, where the instant disclosure provides a thin-type collapsible foot stand comprising: a base unit 1, a first rotatable unit 2 and a second rotatable unit 3.

Referring to FIG. 1 to FIG. 4, the base unit 1 includes a base body 10, where the base body 10 has a first pivot portion 10A, a first connection portion 10B extending from the first pivot portion 10A, and a first extending portion 10C extending from the first connection portion 10B, and the base body 10 has a first lateral surface 101 and a second lateral surface 102 corresponding to the first lateral surface 101. In addition, the first rotatable unit 2 includes a rotatable platform 20 corresponding to the base body 10, where the rotatable platform 20 has a second pivot portion 20A corresponding to the first extending portion 10C, a second connection portion 20B extending from the second pivot portion 20A and corresponding to the first connection portion 10B, and a second extending portion 20C extending from the second connection portion 20B and corresponding to the first pivot portion 10A, and the rotatable platform 20 has a first lateral surface 201 and a second lateral surface 202 corresponding to the first lateral surface 201. Moreover, the second rotatable unit 3 includes two rotatable support frames 30, where each rotatable support frame 30 includes a support body 30A disposed between the base body 10 and the rotatable platform 20, a first pivot structure 30B (such as a torsion hinge) connected between one end portion of the support body 30A and the first pivot portion 10A, and a second pivot structure 30C (such as a torsion hinge) connected between the other end portion of the support body 30A and the second pivot portion 20A, thus the two rotatable support frames 30 can be rotatably and pivotally disposed between the base body 10 and the rotatable platform 20.

Furthermore, referring to FIG. 1 to FIG. 4, the bottom surface of the first pivot portion 10A, the bottom surface of the first connection portion 10B and the bottom surface of the first extending portion 10C may be substantially flushed with each other, and the top surface of the second pivot portion 20A, the top surface of the second connection portion 20B and the top surface of the second extending portion 20C may be substantially flushed with each other. In addition, the top surface of the first pivot portion 10A and the bottom surface of the second extending portion 20C can be mated with each other, the top surface of the first connection portion 10B and the bottom surface of the second connection portion 20B can be mated with each other, and the top surface of the first extending portion 10C and the bottom surface of the second pivot portion 20A can be mated with each other. For example, the top surface of the first pivot portion 10A and the bottom surface of the second extending portion 20C are mated with each other, the top surface of the first connection portion 10B and the bottom surface of the second connection portion 20B are mated with each other, and the top surface of the first extending portion 10C and the bottom surface of the second pivot portion 20A are mated with each other, thus when the rotatable platform 20 is stacked onto the base body 10, the bottom surface of the first pivot portion 10A, the bottom surface of the first connection portion 10B and the bottom surface of the first extending portion 10C are substantially flushed with each other, and the top surface of the second pivot portion 20A, the top surface of the second connection portion 20B and the top surface of the second extending portion 20C are substantially flushed with each other. In addition, when the rotatable platform 20 is stacked onto the base body 10, the first lateral surface 101 of the base body 10 and the first lateral surface 201 of the rotatable platform 20 are substantially flushed with each other, the second lateral surface 102 of the base body 10 and the second lateral surface 202 of the rotatable platform 20 are substantially flushed with each other, and the two rotatable support frames 30 are respectively disposed on the first lateral surface 101 and the second lateral surface 102 of the base body 10 and are respectively disposed on the first lateral surface 201 and the second lateral surface 202 of the rotatable platform 20.

Figure 5:
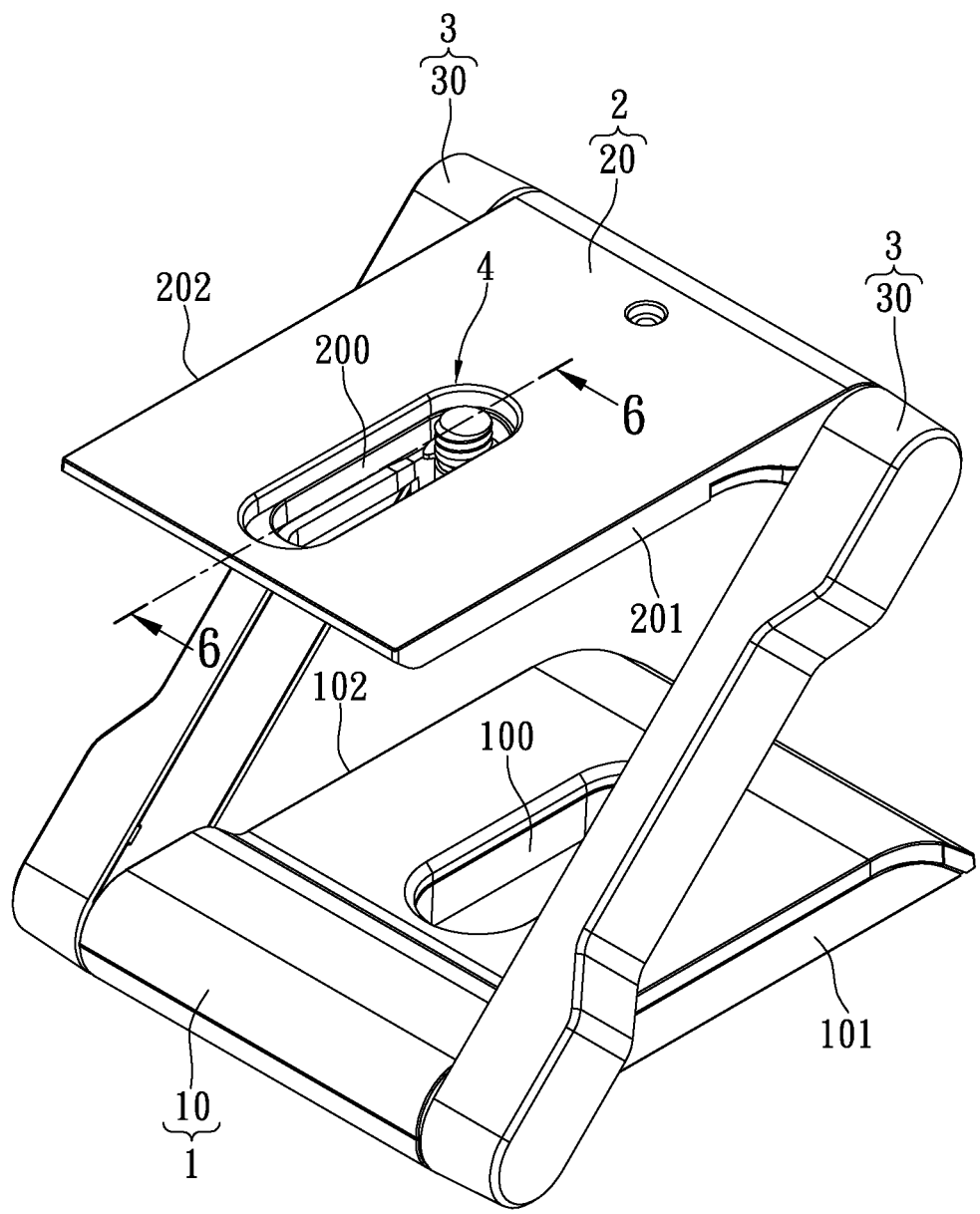
FIG. 5 shows a perspective, exploded, schematic view of the thin-type collapsible foot stand having not been collapsed yet according to the instant disclosure.

Moreover, referring to FIG. 1 to FIG. 4 and FIG. 5, the first pivot portion 10A has two first fixing holes 100A respectively formed on two opposite sides of the first pivot portion 10A, and the second pivot portion 20A has two second fixing holes 200A respectively formed on two opposite sides of the second pivot portion 20A. Each first pivot structure 30B includes a first inner pivot element 300B fixed in the corresponding first fixing hole 100A and a first outer pivot element 301B fixed in one end of the corresponding support body 30A and pivotally connected to the first inner pivot element 300B, and each second pivot structure 30C includes a second inner pivot element 300C fixed in the corresponding second fixing hole 200A and a second outer pivot element 301C fixed in the other end of the corresponding support body 30A and pivotally connected to the second inner pivot element 300C. For example, the first inner pivot element 300B can be rotated relative to the first outer pivot element 301B and the first outer pivot element 301B can be rotated relative to the first inner pivot element 300B, thus the two support bodies 30A can be rotated relative to the first pivot portion 10A of the base body 10 by mating the first inner pivot element 300B and the first outer pivot element 301B (as shown in FIG. 5). In addition, the second inner pivot element 300C can be rotated relative to the second outer pivot element 301C and the second outer pivot element 301C can be rotated relative to the second inner pivot element 300C, thus the rotatable platform 20 can be rotated relative to the two support bodies 30A by mating the second inner pivot element 300C and the second outer pivot element 301C (as shown in FIG. 5).

Furthermore, referring to FIG. 1 to FIG. 4 and FIG. 6, the base body 10 has a first through opening 100 passing through the first connection portion 10B, and the rotatable platform 20 includes a second through opening 200 passing through the second connection portion 20B and corresponding to the first through opening 100, a surrounding convex rib 203 connected to the second through opening 200 and extending downwardly from the bottom surface of the second connection portion 20B, a C-shaped positioning block 204 connected to the surrounding convex rib 203 and extending downwardly from the surrounding convex rib 203, and a plurality of weights 205 disposed on the bottom surface of the second connection portion 20B and around the surrounding convex rib 203. In addition, the thin-type collapsible foot stand further comprises a securing unit 4 including a bolt 40 slidably disposed in the second through opening 200 and a C-shaped washer 41 disposed on the bolt 40 to prevent the bolt 40 from be escaped from the second through opening 200, where one part of the bolt 40 is received in the second through opening 200, and the other portion of the bolt 40, the surrounding convex rib 203 and the C-shaped positioning block 204 are received in the first through opening 100. For example, referring to FIG. 6, before the rotatable platform 20 is stacked onto the base body 10, the bolt 40 can be moved to an end position in the second through opening 200, thus one part of the bolt 40 can be received in the second through opening 200 and the bolt 40 can be retained by the C-shaped positioning block 204. Hence, after the rotatable platform 20 is stacked onto the base body 10, one part of the bolt 40 (such as bolt post) is received in the second through opening 200 and the other portion of the bolt 40 (such as bolt head) are received in the first through opening 100, thus the bolt 40 cannot be projected from the first through opening 100 and the second through opening 200.

Figure 6:
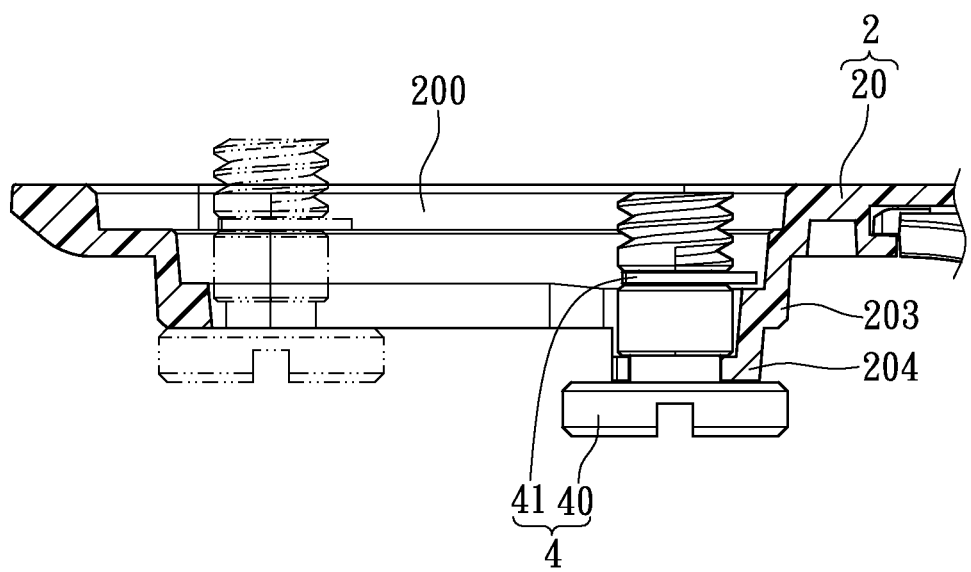
FIG. 6 shows a cross-sectional view taken along the section line 6-6 of FIG. 5.
Figure 7:
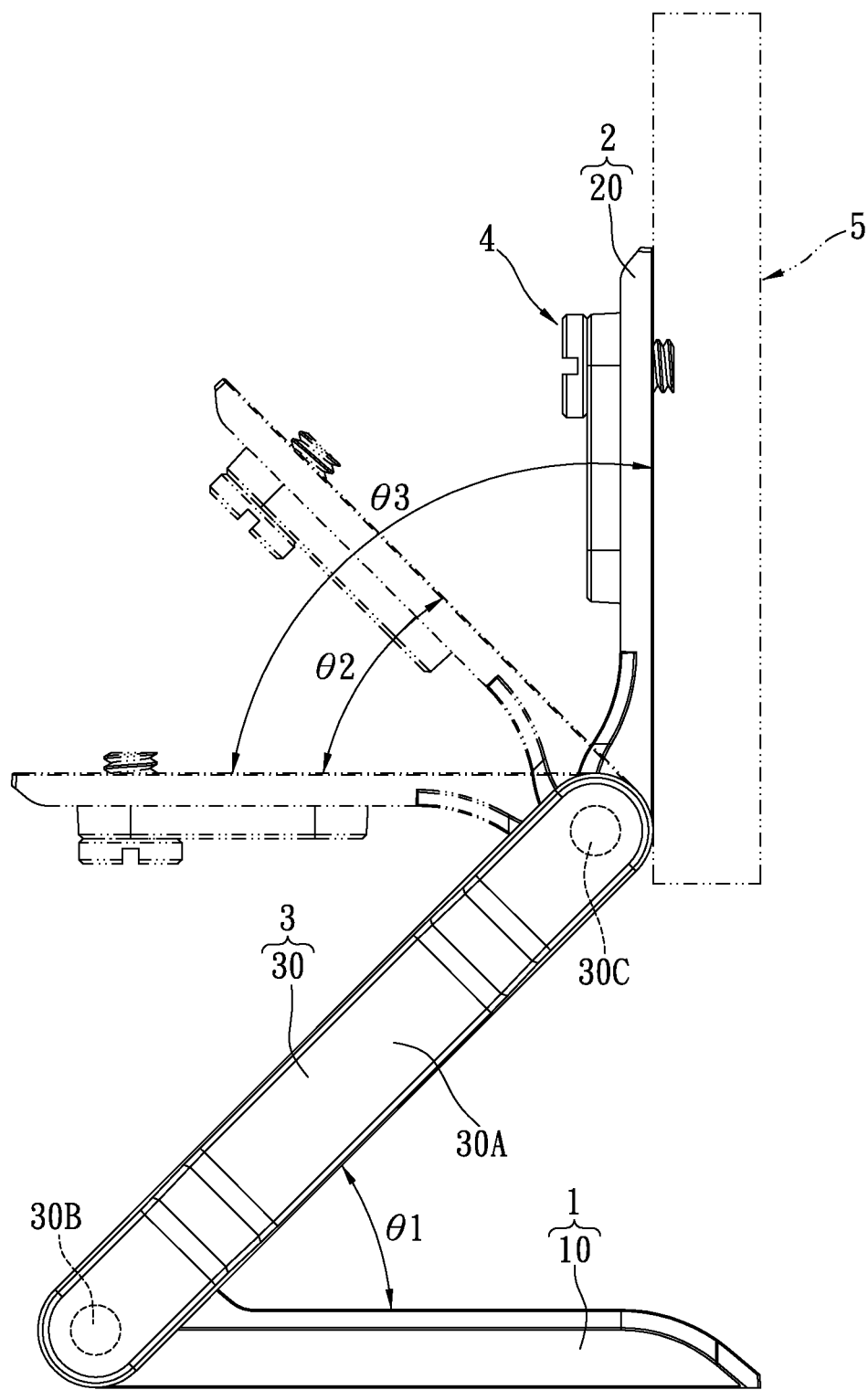
FIG. 7 shows a lateral, schematic view of the thin-type collapsible foot stand used to adjust the usage height and the usage angle of any object (such as projector) fastened on the thin-type collapsible foot stand according to the instant disclosure.

In addition, referring to FIG. 6 and FIG. 7, the two support bodies 30A can be rotated relative to the first pivot portion 10A of the base body 10 by mating the first inner pivot element 300B and the first outer pivot element 301B, thus the rotation angle θ1 of the support body 30A relative to the base body 10 can be adjusted by the first pivot structure 30B according to different requirements. Moreover, the rotatable platform 20 can be rotated relative to the two support bodies 30A by mating the second inner pivot element 300C and the second outer pivot element 301C, thus the rotation angles (θ2, θ3) of the rotatable platform 20 relative to the support body 30A can be adjusted by the second pivot structure 30C according to different requirements. In other words, because the rotation angle θ1 of the support body 30A relative to the base body 10 can be adjusted by the first pivot structure 30B according to different requirements, the usage height of any object (such as projector) fastened on the rotatable platform 20 can be adjusted according to different requirements. In addition, because the rotation angles (θ2, θ3) of the rotatable platform 20 relative to the support body 30A can be adjusted by the second pivot structure 30C according to different requirements, the usage angle of any object (such as projector) fastened on the rotatable platform 20 can be adjusted according to different requirements.

Furthermore, referring to FIG. 1 to FIG. 7 again, the instant disclosure provides a thin-type collapsible foot stand, comprising: a base unit 1, a first rotatable unit 2 and a second rotatable unit 3. The base unit 1 includes a base body 10, where the base body 10 has a first lateral surface 101 and a second lateral surface 102 corresponding to the first lateral surface 101. The first rotatable unit 2 includes a rotatable platform 20 corresponding to the base body 10, where the rotatable platform 20 has a first lateral surface 201 and a second lateral surface 202 corresponding to the first lateral surface 201 of the rotatable platform 20, the first lateral surface 101 of the base body 10 and the first lateral surface 201 of the rotatable platform 20 are substantially flushed with each other, and the second lateral surface 102 of the base body 10 and the second lateral surface 202 of the rotatable platform 20 are substantially flushed with each other. The second rotatable unit 3 includes two rotatable support frames 30 respectively disposed on the first lateral surface 101 and the second lateral surface 102 of the base body 10 and respectively disposed on the first lateral surface 201 and the second lateral surface 202 of the rotatable platform 20, where the two rotatable support frames 30 can be rotatably and pivotally disposed between the base body 10 and the rotatable platform 20.

In conclusion, because the two rotatable support frames are rotatably and pivotally disposed between the base body and the rotatable platform, the usage height and the usage angle of any object (such as projector) fastened on the thin-type collapsible foot stand can be adjusted according to different requirements.

The above-mentioned descriptions merely represent the preferred embodiments of the instant disclosure, without any intention or ability to limit the scope of the instant disclosure which is fully described only within the following claims Various equivalent changes, alterations or modifications based on the claims of instant disclosure are all, consequently, viewed as being embraced by the scope of the instant disclosure.

What is claimed is:

1. A thin-type collapsible foot stand, comprising:
   a base unit including a base body, wherein the base body has a first pivot portion, a first connection portion extending from the first pivot portion, and a first extending portion extending from the first connection portion, wherein the base body has a first through opening passing through the first connection portion;
   a first rotatable unit including a rotatable platform corresponding to the base body, wherein the rotatable platform has a second pivot portion corresponding to the first extending portion, a second connection portion extending from the second pivot portion and corresponding to the first connection portion, and a second extending portion extending from the second connection portion and corresponding to the first pivot portion, wherein the rotatable platform includes a second through opening passing through the second connection portion and corresponding to the first through opening, a surrounding convex rib connected to the second through opening and extending downwardly from the bottom surface of the second connection portion, and a C-shaped positioning block connected to the surrounding convex rib and extending downwardly from the surrounding convex rib;
   a second rotatable unit including two rotatable support frames, wherein each rotatable support frame includes a support body disposed between the base body and the rotatable platform, a first pivot structure connected between one end portion of the support body and the first pivot portion, and a second pivot structure connected between the other end portion of the support body and the second pivot portion, thus the two rotatable support frames are rotatably and pivotally disposed between the base body and the rotatable platform; and
   a securing unit including a bolt slidably disposed in the second through opening and a C-shaped washer disposed on the bolt, wherein the thin-type collapsible foot stand is positionable between an expanded position where the base body and the rotatable platform are spaced apart from one another, and the securing bolt is spaced away from the first through opening, and a collapsed position where the base body and the rotatable platform are adjacent one another, one part of the bolt is received in the second through opening, and the other portion of the bolt, the surrounding convex rib and the C-shaped positioning block are received in the first through opening, wherein the bolt comprises a head portion, a neck portion connected to and extending away from the head portion, a raised shoulder portion connected to and extending away from the neck portion, and a threaded shank portion connected to and extending away from the raised shoulder portion, the head portion and the raised portion each have a cross section wider than a cross section of the neck portion, wherein the C-shaped washer is received between the raised shoulder portion and the threaded shank portion and prevents the bolt from falling out of the second through opening, wherein the second through opening is an elongated stepped opening formed by stepped interior sidewalls of the second connection portion, the surrounding convex rib and the C-shaped positioning block, wherein the elongated stepped opening has a first end portion and a second end portion opposite the first end portion, wherein the threaded shank portion protrudes outwardly from the second connection portion when the bolt is slid into the first end portion, and wherein the threaded shank portion is entirely recessed into the second connection portion and at least a portion of the C-shaped positioning block is received between the head portion and the raised shoulder portion when the bolt is slid into the second end portion.

2. The thin-type collapsible foot stand of claim 1, wherein the first pivot portion has two first fixing holes respectively formed on two opposite sides thereof, and the second pivot portion has two second fixing holes respectively formed on two opposite sides thereof, wherein the first pivot structure includes a first inner pivot element fixed in the corresponding first fixing hole and a first outer pivot element fixed in the corresponding support body and pivotally connected to the first inner pivot element, and the second pivot structure includes a second inner pivot element fixed in the corresponding second fixing hole and a second outer pivot element fixed in the corresponding support body and pivotally connected to the second inner pivot element.

3. The thin-type collapsible foot stand of claim 1, wherein the bottom surface of the first pivot portion, the bottom surface of the first connection portion and the bottom surface of the first extending portion are substantially flushed with each other, and the top surface of the second pivot portion, the top surface of the second connection portion and the top surface of the second extending portion are substantially flushed with each other, wherein the top surface of the first pivot portion and the bottom surface of the second extending portion are mated with each other, the top surface of the first connection portion and the bottom surface of the second connection portion are mated with each other, and the top surface of the first extending portion and the bottom surface of the second pivot portion are mated with each other.

4. The thin-type collapsible foot stand of claim 1, wherein the rotatable platform includes a plurality of weights disposed on the bottom surface of the second connection portion and around the surrounding convex rib.

5. A thin-type collapsible foot stand, comprising:
a base unit including a base body, wherein the base body has a first lateral surface and a second lateral surface corresponding to the first lateral surface, wherein the base body has a first through opening;
a first rotatable unit including a rotatable platform corresponding to the base body, wherein the rotatable platform has a first lateral surface and a second lateral surface corresponding to the first lateral surface of the rotatable platform, the first lateral surface of the base body and the first lateral surface of the rotatable platform are substantially flushed with each other, and the second lateral surface of the base body and the second lateral surface of the rotatable platform are substantially flushed with each other, wherein the rotatable platform includes a second through opening corresponding to the first through opening, a surrounding convex rib connected to the second through opening, and a C-shaped positioning block connected to the surrounding convex rib and extending downwardly from the surrounding convex rib;
a second rotatable unit including two rotatable support frames respectively disposed on the first lateral surface and the second lateral surface of the base body and respectively disposed on the first lateral surface and the second lateral surface of the rotatable platform, wherein the two rotatable support frames are rotatably and pivotally disposed between the base body and the rotatable platform; and
a securing unit including a bolt slidably disposed in the second through opening and a C-shaped washer disposed on the bolt, wherein the thin-type collapsible foot stand is positionable between an expanded position where the base body and the rotatable platform are spaced apart from one another, and the securing bolt is spaced away from the first through opening, and a collapsed position where the base body and the rotatable platform are adjacent one another, one part of the bolt is received in the second through opening, and the other portion of the bolt, the surrounding convex rib and the C-shaped positioning block are received in the first through opening, wherein the bolt comprises a head portion, a neck portion connected to and extending away from the head portion, a raised shoulder portion connected to and extending away from the neck portion, and a threaded shank portion connected to and extending away from the raised shoulder portion, the head portion and the raised portion each have a cross section wider than a cross section of the neck portion, wherein the C-shaped washer is received between the raised shoulder portion and the threaded shank portion and prevents the bolt from falling out of the second through opening, wherein the second through opening is an elongated stepped opening formed by stepped interior sidewalls of the second connection portion, the surrounding convex rib and the C-shaped positioning block, wherein the elongated stepped opening has a first end portion and a second end portion opposite the first end portion, wherein the threaded shank portion protrudes outwardly from the second connection portion when the bolt is slid into the first end portion, and wherein the threaded shank portion is entirely recessed into the second connection portion and at least a portion of the C-shaped positioning block is received between the head portion and the raised shoulder portion when the bolt is slid into the second end portion.

6. The thin-type collapsible foot stand of claim 5, wherein the base body has a first pivot portion, a first connection portion extending from the first pivot portion, and a first extending portion extending from the first connection portion, the rotatable platform has a second pivot portion corresponding to the first extending portion, a second connection portion extending from the second pivot portion and corresponding to the first connection portion, and a second extending portion extending from the second connection portion and corresponding to the first pivot portion, and each rotatable support frame includes a support body disposed between the base body and the rotatable platform, a first pivot structure connected between one end portion of the support body and the first pivot portion, and a second pivot structure connected between the other end portion of the support body and the second pivot portion.

7. The thin-type collapsible foot stand of claim 6, wherein the first pivot portion has two first fixing holes respectively formed on two opposite sides thereof, and the second pivot portion has two second fixing holes respectively formed on two opposite sides thereof, wherein the first pivot structure includes a first inner pivot element fixed in the corresponding first fixing hole and a first outer pivot element fixed in the corresponding support body and pivotally connected to the first inner pivot element, and the second pivot structure includes a second inner pivot element fixed in the corresponding second fixing hole and a second outer pivot element fixed in the corresponding support body and pivotally connected to the second inner pivot element.

8. The thin-type collapsible foot stand of claim 6, wherein the bottom surface of the first pivot portion, the bottom surface of the first connection portion and the bottom surface of the first extending portion are substantially flushed with each other, and the top surface of the second pivot portion, the top surface of the second connection portion and the top surface of the second extending portion are substantially flushed with each other, wherein the top surface of the first pivot portion and the bottom surface of the second extending portion are mated with each other, the top surface of the first connection portion and the bottom surface of the second connection portion are mated with each other, and the top surface of the first extending portion and the bottom surface of the second pivot portion are mated with each other.

* * * * *